United States Patent [19]

Nguyen

[11] Patent Number: 4,999,193

[45] Date of Patent: Mar. 12, 1991

[54] FEED ADDITIVE FOR ANIMALS, FEEDS CONTAINING SUCH AN ADDITIVE AND METHOD FOR IMPROVING THE GROWTH OF ANIMALS

[75] Inventor: Tan H. Nguyen, Saint-Avé, France

[73] Assignee: Etablissements Guyomarc'h S.A., Paris, France

[21] Appl. No.: 204,117

[22] Filed: Jun. 8, 1988

[30] Foreign Application Priority Data

Jun. 16, 1987 [FR] France ................................ 8708381

[51] Int. Cl.5 ...................... A61K 37/00; A61K 35/78

[52] U.S. Cl. .................................. 424/93; 424/195.1; 435/252.5; 435/834

[58] Field of Search ............... 424/195.1, 93; 435/834, 435/253, 252.5

[56] References Cited

U.S. PATENT DOCUMENTS

| | | | |
|---|---|---|---|
| 2,744,015 | 5/1956 | Katsube et al. | 424/93 |
| 4,018,650 | 4/1977 | Busta et al. | 195/128 |

FOREIGN PATENT DOCUMENTS

| | | | |
|---|---|---|---|
| 1077772 | 5/1980 | Canada | 99/50 |
| 232777 | 7/1984 | Czechoslovakia . | |
| 52-8381 | 3/1977 | Japan | 424/93 |
| 52-8382 | 3/1977 | Japan | 424/93 |
| 0174061 | 10/1982 | Japan | 424/195.1 |

OTHER PUBLICATIONS

Vidal Dictionary, 1985, p. 142, OVP, Paris.

Chemical Abstracts, vol. 106, No. 9, Item 66306t, Mar. 2, 1987.

*Primary Examiner*—John W. Rollins

*Attorney, Agent, or Firm*—Dressler, Goldsmith, Shore, Sutker & Milnamow, Ltd.

[57] ABSTRACT

The present invention relates to a non-medicinal feed additive promoting the growth of animals, the supplemented feeds in which it is present and a method for improving the growth of animals.

The feed additive according to the invention comprises *Bacillus cereus,* IP 5832 strain, and/or the vegetative spores of this microorganism.

5 Claims, No Drawings

FEED ADDITIVE FOR ANIMALS, FEEDS CONTAINING SUCH AN ADDITIVE AND METHOD FOR IMPROVING THE GROWTH OF ANIMALS

The present invention relates to a non-medicinal feed additive promoting the growth of animals, the supplemented feeds in which it is present and a method for improving the growth of animals.

"Growth-promoting" feed additives have been used for a long time to improve the zootechnical performance of animals (mammals, birds or fish). They are products obtained either by fermentation or by chemical synthesis.

There is an increasing tendency for these "growth promoters" to be replaced or have their effects complemented by another class of feed additives: "probiotics".

Just like other "growth promoters", probiotics are used in low doses incorporated continuously into the animal feed. These doses vary according to the nature of the products, the species and age of the animals and the extent to which the animals ingest the products. It should be noted, however, that these low doses provide only a few milligrams of microbial protein, affording a clear distinction between this use of microorganisms as "probiotics" and the use of microorganisms as sources of single cell protein (SCP) of microbial origin.

Numerous microorganisms have been proposed as probiotics: *Lactobacillus acidophilus, bifidus, bulgaricus, casei, lactis* and *plantarum; Bacillus subtilis; Streptococcus faecium* (cremoris) and *diacetilactus;* Torulopsia; *Aspergillus oryzae;* and Streptomyces.

Nevertheless, the use of these microorganisms as feed additives is faced with certain difficulties; some of these difficulties arise in particular from the fact that the majority of these microorganisms are wholly or partly destroyed by the heat used in (or produced by) the usual technological processes for the manufacture of animal feeds, principally during conversion to granules (or pellets). This destruction will obviously render these microorganisms ineffective or make their efficacy random.

It has been known for a long time that the vegetative spores of "sporular" microorganisms can withstand high temperatures (G. W. Gould and A. Hurst, 1969).

A probiotic feed additive consisting of bacterial spores has the decisive advantage of remaining stable in the technological process for the manufacture of animal feeds (conversion to granules or pellets).

An example of this type of probiotic is TOYOCERINE® (name registered by the Japanese company TOYO JOZO), which is an additive containing vegetative spores of *Bacillus toyoi.*

It has been found that *Bacillus cereus,* IP 5832 strain, and the vegetative spores of this microorganism constitute particularly valuable additives for animal feeds; it is this finding which forms the basis of the present invention.

It will be noted that the vegetative spores of non-pathogenic *Bacillus cereus,* IP 5832 strain, have long been marketed and used as an antidiarrheal drug in human medicine under the mark BACTISUBTIL®. This application involves massive daily provisions of microorganisms: 3 to 6 billion germs for infants and children and 4 to 8 billion germs for adolescents and adults (Vidal dictionary).

German Patent 2 622 982 describes the use of *Bacillus cereus* in a method for the heat treatment of microorganisms to give proteins with a low nucleic acid content, which are intended for human consumption.

The present invention therefore relates to the use of *Bacillus cereus,* IP 5832 strain, and/or its vegetative spores as a non-medicinal feed additive favoring the growth of animals.

The present invention also relates to supplemented animal feeds which contain *Bacillus cereus,* IP 5832 strain, and/or the vegetative spores of this microorganism. Preferably, these feeds will contain, per gram, about 100,000 to about 5,000,000 revivable germs of the said microorganism or its vegetative spores.

Finally, the present invention also relates to a method for favoring the growth of animals, which consists in incorporating, into the feed of the said animals, about 100,000 to about 5,000,000 germs of *Bacillus cereus,* IP 5832 strain, and/or its vegetative spores per gram of feed.

The doses incorporated can vary according to the species and age of the animals, the extent to which the animals ingest the products and, to a degree, the desired effect. It will rest with the specialist, aided by systematic tests, to determine the optimum dose for each use.

The feeds can equally well be presented in any of the usual forms known in farming.

The feeds can be simple or compound and complete or complementary.

The animals' drinking water can also be used as a vehicle for *Bacillus cereus,* IP 5832 strain, and its spores.

The beneficial effects of this feed additive (on mammals, birds and fish) can be summarized in the following way:

it increases the growth of the animals; and/or it lowers their consumption index (i.e. the amount of feed required per unit gain in weight) and, as a corollary, increases their conversion index (i.e. the gain in weight achieved per unit of feed).

In practice, the additive to be incorporated into the feeds can be presented in the pure form or as a mixture with various carriers and/or other permitted additives.

The non-limiting Examples which follow illustrate the invention.

EXAMPLE 1

96 piglets are divided into four homogeneous groups each containing 24 animals. The animals are housed in flat deck cages with 6 animals to a cage. The feeds (in granular form) for the piglets are as follows:

Group A:
Commercial formula used as the reference.

Group B:
Same basic formula as A but additionally containing *Bacillus cereus,* IP 5832 strain, and its spores.

Group C:
Same basic formula as A but additionally containing TOYOCERINE®.

Group D:
Same basic formula as A but additionally containing a commercial probiotic Y.

The mean performances of the 4 groups after 28 days of experimentation were as follows:

| GROUP | A | B | C | D |
|---|---|---|---|---|
| Live weight (kg) | | | | |
| Initial | 6.23 | 6.25 | 6.26 | 6.26 |

-continued

| GROUP | A | B | C | D |
|---|---|---|---|---|
| Final | 15.41 | 17.23 | 16.40 | 15.86 |
| Mean daily gain in weight (g) | 328 (100.0%) | 392 (119.5%) | 362 (110.4%) | 343 (104.6%) |
| Consumption index | 1.67 (100.0%) | 1.56 (93.4%) | 1.55 (92.8%) | 1.58 (94.6%) |

EXAMPLE 2

69 young rabbits were divided on the day of weaning into 3 homogeneous groups each containing 23 animals. The animals are housed in grid cages divided into "randomized blocks". The 3 groups of animals received the following 3 feeds (in granular form):

Group A:

Commercial formula used as the reference.

Group B:

Same basic formula but containing TOYOCERINE®.

Group C:

Same basic formula but containing *Bacillus cereus,* IP 5832 strain, and its spores.

The mean performances of the animals were as follows after 28 days of experimentation:

| GROUP | A | B | C |
|---|---|---|---|
| Live weight (g) | | | |
| Initial | 690 | 689 | 717 |
| Final | 1672 | 1699 | 1787 |
| Gain in weight (g) | 982 (100.0%) | 1010 (102.8%) | 1070 (109.0%) |
| Consumption index | 2.53 (100.0%) | 2.42 (95.6%) | 2.33 (92.1%) |

EXAMPLE 3

240 day-old female chicks of the species *Gallus domesticus* were divided into 4 homogeneous groups each containing 60 animals. The chicks are housed in individual grid cages arranged in "randomized blocks".

Group I receives a conventional so-called "starter" feed for chicks and is used as the control group.

Group II receives the same basic feed but additionally containing *Bacillus cereus,* IP 5832 strain, and its spores.

Group III receives the same basic feed but additionally containing TOYOCERINE®.

Group IV receives the same basic feed but additionally containing the commercial antibiotic growth promoter AVOPARCINE®.

The feeds are presented in the form of meal.

The mean performances of the 4 groups of chicks were as follows after 15 days of experimentation:

| GROUP | I | II | III | IV |
|---|---|---|---|---|
| Live weight (g) | 285 (100.0%) | 296 (103.8%) | 292 (102.4%) | 286 (100.4%) |
| Consumption index | 1.74 (100.0%) | 1.67 (96.0%) | 1.69 (97.2%) | 1.72 (98.8%) |

EXAMPLE 4

The aim of this experiment is to measure the influence of Bacillus IP 5832, incorporated into the feed of female rabbits, on the growth of the young rabbits from birth to weaning.

72 gestating SPF (specific pathogen free) rabbits were divided into two groups as from the last week of their gestation.

2 feeds are distributed to the rabbits:

A: reference

B: =A supplemented with Bacillus IP 5832 at a rate of one million germs per gram of feed.

These 2 feeds are distributed ad libitum as from the last week of gestation and throughout lactation (31 days) following littering.

On weaning, the weights of the young rabbits born to the rabbits fed with these 2 feeds were compared.

It should be noted that SPF animals are bred in a "protected" building, in the absence of any pathological germs (the air is filtered; the research workers take a complete shower with shampoo before entering the room; clothes are disinfected; etc.).

On weaning, the mean live weights of the young rabbits were as follows:

Group A (control): 750 g

Group B (IP 5832): 807 g (+7.5%)

The difference is significant in terms of statistical analysis ($p<0.05$).

What is claimed is:

1. A method for improving the growth of animals requiring no medication which comprises causing said animals to ingest an animal feed or drink containing about 100,000 to about 5,000,000 revivable germs of *Bacillus cereus,* IP 5832 strain, per gram of said feed or drink.

2. The method of claim 1 wherein said animals are pigs.

3. The method of claim 1 wherein said animals are rabbits.

4. The method of claim 1 wherein said animals are poultry animals.

5. The method of claim 1 wherein said ingestion is of an animal feed in granular form.

* * * * *

UNITED STATES PATENT AND TRADEMARK OFFICE

CERTIFICATE OF CORRECTION

PATENT NO. : 4,999,193

DATED : March 12, 1991

INVENTOR(S) : Tan H. Nguyen

It is certified that error appears in the above-identified patent and that said Letters Patent is hereby corrected as shown below:

On the title page:

The assignee should be changed from "Etablissements Guyomarc'h S.A., Paris, France" to --Guyomarc'H Nutrition Animale, Saint Nolff, 56250 Elven, France--

Col. 4, line 9, the percent of the Consumption Index in the Table in Example 3 (under Column III) should be corrected from "97.2%" to --97.1%--.

Signed and Sealed this

Sixteenth Day of March, 1993

*Attest:*

STEPHEN G. KUNIN

*Attesting Officer*

*Acting Commissioner of Patents and Trademarks*